(12) United States Patent
Meurer

(10) Patent No.: US 11,530,094 B2
(45) Date of Patent: Dec. 20, 2022

(54) METHOD FOR REMOVING GOODS FROM A STORAGE DEVICE IN ORDER TO FULFILL AN ORDER

(71) Applicant: Dematic GmbH, Heusenstamm (DE)

(72) Inventor: Hans Christoph Meurer, Framersheim (DE)

(73) Assignee: Dematic GmbH, Heusenstamm (DE)

( * ) Notice: Subject to any disclaimer, the term of this patent is extended or adjusted under 35 U.S.C. 154(b) by 656 days.

(21) Appl. No.: 16/491,874

(22) PCT Filed: Feb. 21, 2018

(86) PCT No.: PCT/EP2018/054291
§ 371 (c)(1),
(2) Date: Sep. 6, 2019

(87) PCT Pub. No.: WO2018/162239
PCT Pub. Date: Sep. 13, 2018

(65) Prior Publication Data
US 2021/0130098 A1   May 6, 2021

(30) Foreign Application Priority Data
Mar. 9, 2017 (DE) .......................... 102017104990.8

(51) Int. Cl.
*G06F 7/00* (2006.01)
*B65G 1/137* (2006.01)
(Continued)

(52) U.S. Cl.
CPC ......... *B65G 1/1378* (2013.01); *B65G 1/0428* (2013.01); *B65G 1/065* (2013.01); *B65G 2209/10* (2013.01)

(58) Field of Classification Search
CPC .... B65G 1/1378; B65G 1/0428; B65G 1/065; B65G 2209/10
(Continued)

(56) References Cited

U.S. PATENT DOCUMENTS 9,466,045 B1 * 10/2016 Kumar ................ G06Q 10/087

FOREIGN PATENT DOCUMENTS

| CN | 1139410 A | 1/1997 |
| CN | 1642834 A | 7/2005 |

(Continued)

OTHER PUBLICATIONS

Preliminary Report on Patentability of the International Searching Authority in English from corresponding Patent Cooperation Treaty (PCT) Application No. PCT/EP2018/054291, completed Sep. 10, 2019.

(Continued)

*Primary Examiner* — Yolanda R Cumbess
(74) *Attorney, Agent, or Firm* — Gardner, Linn, Burkhart & Ondersma LLP

(57) ABSTRACT

A method of fulfilling orders of goods of mixed packs and single packs of the same type. The goods are first stored as single packs of the same type and all of the goods allocated to an order are removed from a specified order storage rack aisle of a storage rack. Goods present in the storage racks required for the order that are not present within the specified order storage rack aisle are transferred into the order storage rack aisle from another storage rack aisle by a transverse transport process. A mixed pack for the order is generated by picking from packs of the same type, and a picking station is supplied with corresponding packs of the same type from the same storage racks, and the mixed pack is stored into the order storage rack aisle. The order, com- (Continued)

prising single packs of the same type and mixed packs, is removed from the specified order storage rack aisle.

17 Claims, 3 Drawing Sheets

(51) Int. Cl.
  *B65G 1/04* (2006.01)
  *B65G 1/06* (2006.01)
(58) Field of Classification Search
  USPC ............... 414/749.1; 700/213–217, 223, 228
  See application file for complete search history.

(56) References Cited

FOREIGN PATENT DOCUMENTS

| | | |
|---|---|---|
| CN | 105314317 A | 2/2016 |
| CN | 105392719 A | 3/2016 |
| CN | 105473469 A | 4/2016 |
| CN | 106458444 A | 2/2017 |
| DE | 102013005116 A1 | 9/2014 |
| EP | 0776308 A1 | 6/1997 |
| EP | 1254852 A1 | 6/2002 |
| EP | 1964792 B1 | 4/2012 |
| EP | 2551218 A1 | 1/2013 |
| EP | 2741977 A1 | 6/2014 |
| EP | 2949604 A1 | 12/2015 |
| JP | H07315520 A | 12/1995 |
| WO | 2015007513 A1 | 1/2015 |

OTHER PUBLICATIONS

International Search Report of the International Searching Authority from corresponding Patent Cooperation Treaty (PCT) Application No. PCT/EP2018/054291, indicated completed on May 18, 2018.
Written Opinion of the International Searching Authority from corresponding Patent Cooperation Treaty (PCT) Application No. PCT/EP2018/054291, indicated completed on May 18, 2018.

* cited by examiner

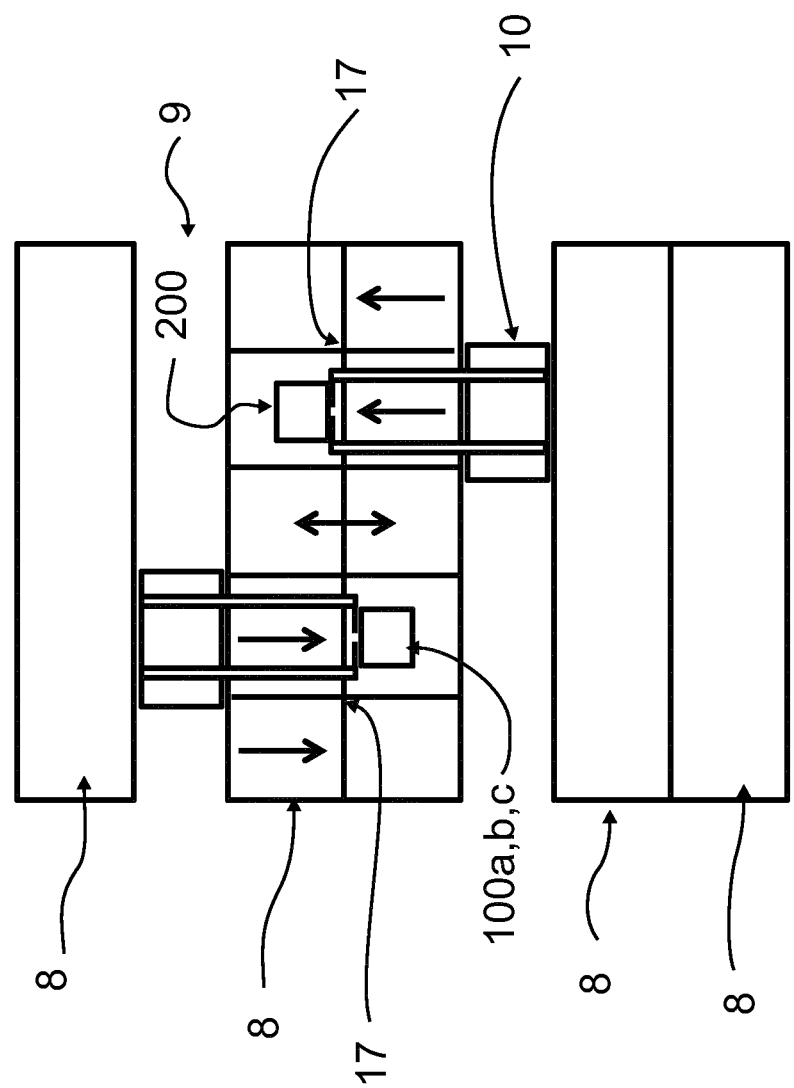

METHOD FOR REMOVING GOODS FROM A STORAGE DEVICE IN ORDER TO FULFILL AN ORDER

CROSS REFERENCE TO RELATED APPLICATION

The present application claims the priority benefits of International Patent Application No. PCT/EP2018/054291, filed Feb. 21, 2018, and claims benefit of German patent application DE 10 2017 104 990.8.

BACKGROUND AND FIELD OF THE INVENTION

The invention relates to a method for removing goods from storage for order fulfilment from a distribution center having a store comprising storage racks having storage rack aisles, wherein the order includes a compilation of goods from single-type and mixed containers, the goods are initially placed into storage in the storage rack in the form of single-type containers and, when the order is present, all the goods assigned to the order are removed from a particular order storage rack aisle of the storage rack.

When picking or compiling orders of goods on single-type transport units or containers, such as e.g. articles, receptacles, it is necessary to make those transport units which carry the goods belonging to a particular order available in a common and optionally sorted manner. To this end, it is typical to intermediately store (buffer) the transport units with goods of an order until all the goods required for the order are present as transport units. Subsequently, these are then released together on a gathering area which carries them e.g. to palletizing, packing station, goods issuing, dispatch, etc. They are thus removed from storage as determined by the order.

When compiling orders, different goods have to be removed from different transport units and compiled in accordance with the order. At the same time, orders can also include, in addition to such picked, mixed transport units (mixed containers), whole transport units, i.e. single-type containers (see above). In this case, orders must be compiled from two different types of transport units which include a different pre-processing, such as e.g. order-picking.

In picking stations, e.g. goods which are likewise required to fulfil an order but only in relatively small amounts are removed from provided storage units and are placed (picked) into an order receptacle according to the order. The thus picked, mixed order receptacles are, as shown above, likewise transported to palletising, packing station, goods issuing, dispatch, etc. in order to fulfil the particular order together with the single-type receptacles (containers).

A (high-level) rack store includes a supply region, or region for placing goods into storage, via which the goods are delivered and separated and from which the rack serving apparatuses collect the goods or single-type containers for placing them into storage—the so-called pre-zone. In a similar manner, a region for removing goods from storage is required, at which the rack serving apparatuses set down the goods after removing them from storage and which is likewise allocated to the pre-zone. In automatic order-picking stores, picking locations are often directly connected via the pre-zone. In most cases, the goods are identified in the pre-zone for the store management system or material flow controller.

The applicant's EP 1 964 792 B1 discloses a method for providing transport units from a store in a desired sequence to at least one gathering area. Rack serving apparatuses in each storage rack aisle, storage-removal lifts and storage-removal tracks are controlled and supplied with goods in a manner adapted to one another such that said goods ultimately end up sorted in the gathering area or are set down thereby.

Controlling and adapting is thus relatively complex and requires an apparent technical outlay in the so-called pre-zone, i.e. the region outside the actual racking.

WO 2014/023539 A1 also discloses a method for providing transport units from a store in a desired sequence, in which between two adjacent storage racks there is a direct exchange of transport units from one storage rack aisle into an adjacent storage rack aisle via cross-conveyance locations in the storage racks themselves. This allows sorting within the racks or aisles themselves and sorting in the pre-zone can be omitted.

SUMMARY OF THE INVENTION

The present invention provides a method that allows goods of mixed orders to be removed from storage with simplified technical and process-engineering outlay.

In accordance with aspects of the present invention, it has been recognized that a method for removing goods from a store for order fulfilment can be provided in a simplified manner when goods present as single-type containers in the storage rack which are required to fulfil an order but are not present within the particular order storage rack aisle of the storage rack are transferred within the storage rack by a cross-transport from another storage rack aisle into the order storage rack aisle and mixed containers of the order are produced by picking from single-type containers and picking stations are supplied with corresponding single-type containers from the same storage rack and the thus produced mixed containers are placed into storage in the order storage rack aisle of the storage rack, and finally all the goods of the order consisting of single-type containers and mixed containers are removed from storage from the particular order storage rack aisle as determined by the order.

In other words, the same store is used simultaneously for order consolidation and as a supply or inventory for order picking. In contrast to the term 'distribution center', 'store' is not meant to mean the generic term 'store' in the sense of a 'warehouse' but is meant to mean the actual store for physically depositing the goods.

'Container' is understood to mean herein a packing unit as a trading unit and loading unit for goods distribution. It is a compilation of products of the same type or different types to be handled together in the logistical chain (e.g. retail ordering). The term 'container' is used for a package, the entity consisting of goods to be packaged and the packaging, a packing piece, the package to be transported and a packaging consisting of a piece, as empty containers.

In accordance with an aspect of the present invention, removing goods of mixed orders from storage in a sorted manner can be provided in a simplified manner when goods present as single-type containers which are required to fulfil an order but are not present within the particular order storage rack aisle of the storage rack are transferred within the storage rack by a cross-transport from another storage rack aisle into the order storage rack aisle, with subsequent removal of all goods from storage as single-type and mixed containers from the storage-removal rack aisle.

In other words, goods of an order which are not required in the amount of a complete single-type container are picked at a picking station to form mixed containers.

Subsequently, this mixed container is then placed into storage in a storage rack aisle, namely the particular order storage rack aisle. The picking station is supplied with goods by stored, single-type containers from the same storage rack. In order to complete the order, single-type containers which are required for the order are subsequently supplied by cross-transport within the storage racks of the order storage rack aisle which is provided for the goods of the relevant order.

By using such a process, the placing into storage of single-type containers by the picking operation is not hindered or interrupted without separate storage being required for this purpose. Therefore, goods can be quickly and efficiently placed into storage in the storage racks and are only then removed when goods are required to supply the picking station or all the goods are provided for order fulfilment.

The at least one picking station can be arranged e.g. integrated in the store but can also be designed as an independent system with goods buffers. A direct connection to a particular one, or a group of, storage rack aisles is also e.g. possible. The picking station can be arranged in a picking level, e.g. identical to the storage-removal level, or else also in a plurality of levels or dedicated picking regions.

Independently of the picking of goods for mixed containers provided in an order, sorting of the goods provided for an order can also take place within the store. Connecting conveying technology via the aisles in the pre-zone can thus be omitted and an additional sorting step is not required.

Furthermore, one advantage of the invention is that the storage-removal rack aisle is determined by the placing of picked, mixed containers into storage.

Therefore, a "cross-sorting" of goods within the store or storage rack is only required in one direction: from the storage rack aisle of the single-type containers into the order storage rack aisle. Sorting processes with cross-conveyance of single-type and additionally mixed containers thus does not take place which considerably simplifies the sorting within the storage racks.

It is also advantageous that goods can be removed from storage in a sorted manner according to a subsequent unpacking sequence in order to pack said goods in this sequence even on these pallets or roll cars etc. for delivery.

In this way, for example the subsequent unloading of the order from the load carrier (e.g. pallets or roll cars) in the store or shop can be simplified in that the order is sorted in a so-called shop layout. 'Shop layout' is understood to mean that the goods are packed in the reverse sequence to the subsequent unpacking sequence. The unpacking sequence is determined by the rack and goods arrangement in the shop. Typically, particular goods are thus also arranged grouped together, such as toiletries or cleaning agents, etc.

A further advantageous embodiment of the invention makes provision that goods are moved within the storage rack aisles by rack serving apparatuses, in particular shuttle vehicles.

Therefore, a particularly high storage-removal performance can be achieved and flexible and rapid sorting within the store can be ensured.

It is also particularly preferred that goods are cross-transported between adjacent storage rack aisles via cross-conveyance locations within adjacent storage racks by means of movement by the load picking-up means of the rack serving apparatuses themselves.

By actively "passing through" or "pushing through" the goods by the load picking-up means of the rack serving apparatuses or shuttle vehicles, a cross-transport can be performed without functionalizing the cross-conveyance locations themselves, i.e. for example without equipping the cross-conveyance locations with conveying means such as conveyor belts or conveyor rollers. The cross-transport by rack serving apparatuses or shuttle vehicles is thus a simplification in terms of design and technology.

A cross-transport of the goods can likewise take place between storage rack aisles via aisle-changing rack serving apparatuses if e.g. so-called roaming shuttles are used which travel from the respective aisle and into other aisles of the store or levels, with and without the use of a lift. Likewise, an aisle change can take place via dedicated travel paths which allow the movement of a rack serving apparatus or shuttle from one aisle to the next, without transferring, by means of crossing areas or turns.

Further features and details of the invention will be apparent from the following description of the drawings.

BRIEF DESCRIPTION OF THE DRAWINGS

FIG. 3 shows a schematic plan view of a cross-transport in the store of FIG. 2.

DESCRIPTION OF THE PREFERRED EMBODIMENTS

Figure 1:
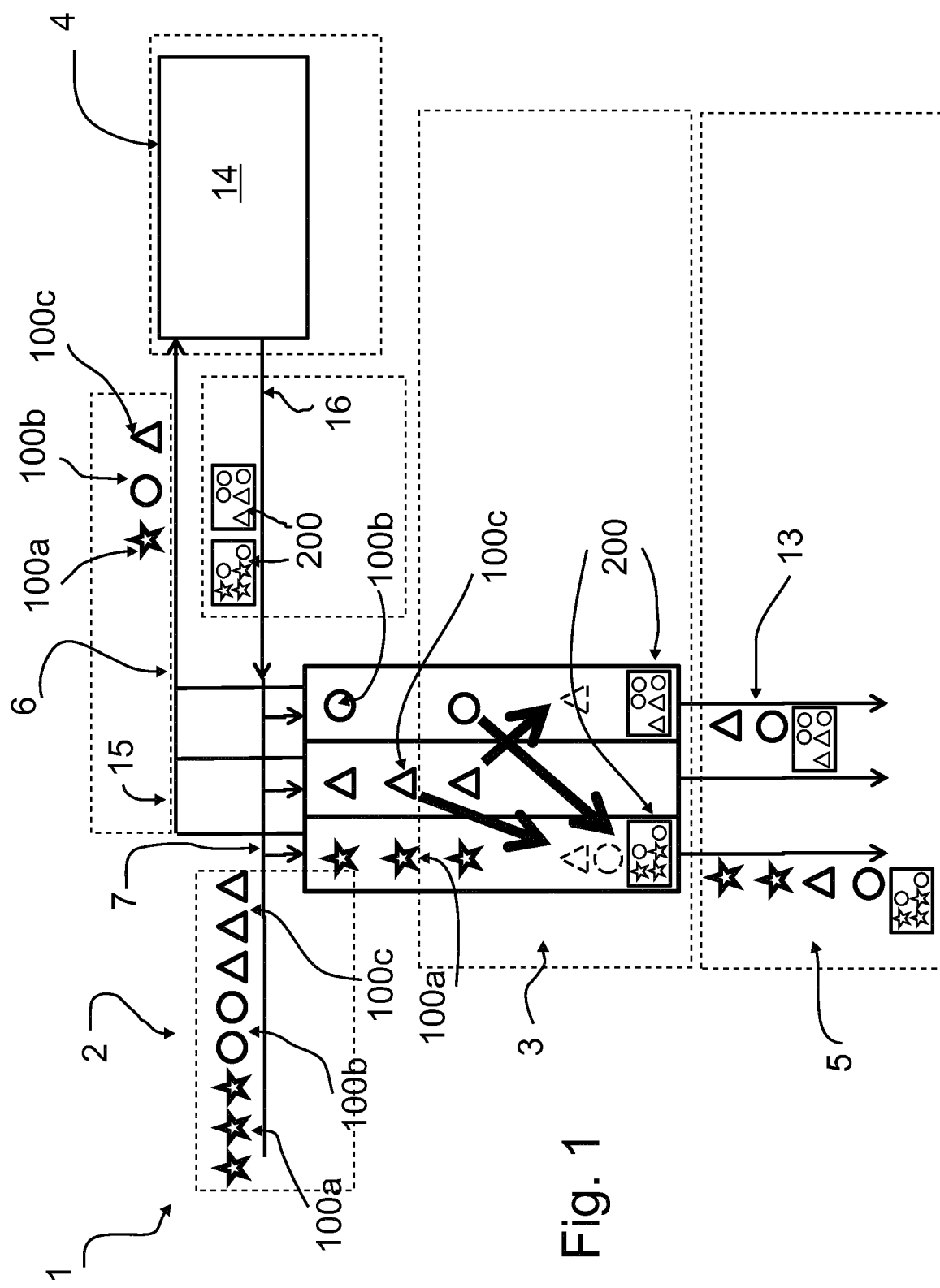
FIG. 1 shows a schematic illustration of a block-like sequence of a method for removing goods from storage from a distribution and supply center having a store.
Figure 2:
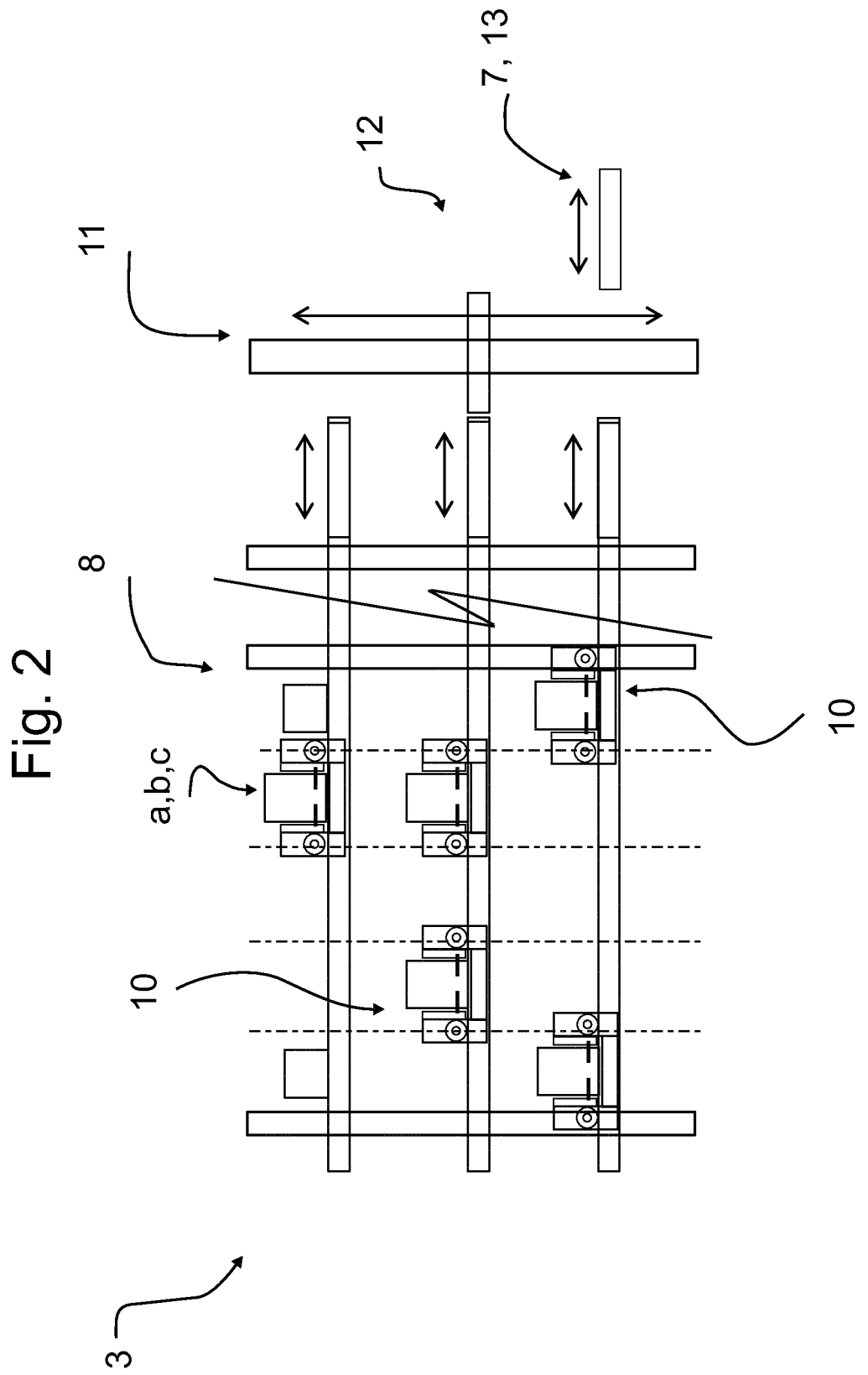
FIG. 2 shows a schematic side view of the store of FIG. 1.

FIG. 1 shows a plan view of a distribution and supply center designated as a whole by reference numeral 1.

It includes an entry region 2 which includes a pallet store for storing the supply of single-type goods a, b, c. Furthermore, a storing region 3, a picking region 4 and an exit region 5 are provided for order completion (packaging and dispatching). The entry region 2, the storing region 3 and the picking region 4 are connected via a conveying system 6.

In the storing region 3, the goods a, b, c for the orders are placed into storage.

Goods a, b, c are conveyed via the entry region 2 after depalletization in the form of single-type containers 100 via a conveying path 7 for placement into storage in storage racks 8 of the storing region 3.

The single-type containers 100 with the goods a, b, c with a different type of goods, illustrated by star, circle and triangle symbols, are placed into storage in the storage racks 8, initially according to an optimized distribution which takes into account e.g. groups of goods.

The storing region 3 includes storage racks 8 on multiple levels. The storage racks 8 are arranged such that the storage racks 8 not arranged on the outside are each arranged in pairs adjoining one another and have a storage rack aisle 9 on one side. The inner storage racks 8 thus abut one another "back-to-back". A storage rack aisle 9 must thus be present between opposite storage racks 8. Goods a, b, c are transported within the storage rack aisles 9 via shuttle vehicles 10.

The shuttle vehicles 10 travel along the rack aisles on rails in the respective storage level. The shuttle vehicles 10 remove items from, and load items into, corresponding rack locations in the transverse direction by extendible and retractable telescopic arms in a known manner, as disclosed e.g. in the applicant's EP 2 741 977 A1.

Different rack levels of the storage rack aisles 9 are connected to a storage-removal level 12 of the exit region 5 via goods lifts 11. Each storage rack aisle 9 or each order storage rack aisle 9 is allocated an exit conveying path 13, via which the goods are removed from storage from the aisle or an order.

The picking region 4 includes at least one picking station 14 and optionally a buffer store for source containers for picking. The picking station 14 is supplied via a conveying path 15 with goods in the form of single-type containers 100*a, b, c* from the storage racks 8 of the storing region 3.

When an order is present, goods are picked in the picking station to form mixed containers 200.

Mixed containers 200 are illustrated by rectangular symbols each having different types of goods a, b, c according to the order. The picked, mixed containers 200 are supplied to the storing region 3 via an entry conveying path 16 and are placed into storage in the storage racks 8 via storage-placement conveying paths 7.

In the storage racks 8 or storage rack aisles 9, goods are thus placed into storage in the form of single-type containers 100 and mixed containers 200 and are used for order fulfilment, for which purpose an order is then removed from storage from a particular storage rack aisle 9 accordingly as single-type and mixed containers 100, 200. The order thus includes goods in sorted containers 100 and mixed containers 200 which are subsequently delivered in packed form on pallets or roll cars.

Single-type containers 100 exclusively include goods of the same type. Mixed containers 200 include mixed goods.

The containers are moved within the storage racks 8 by the shuttle vehicles 10.

Within the storing region 3, all required goods of an order are consolidated in a storage rack aisle 9, the so-called order storage rack aisle.

This means that mixed containers 200, by being placed into storage in a particular storage rack aisle 9, fix or determine this aisle as the order storage rack aisle 9 for the (remaining) goods of the order.

For the consolidation or sorting of goods of the order within the storage racks 8, goods can be supplied by cross-conveyance between two adjacent storage racks 8 to another storage rack 8.

Special cross-conveyance locations 17 for the cross-conveyance of containers 100, 200 from one storage rack 8 to an adjacent storage rack 8 are provided in each level in the storage racks 8 and so an exchange of containers within the storage racks 8 themselves takes place and corresponding outlay in a pre-zone can be omitted.

The cross-conveyance takes place by the load picking-up means of the shuttle vehicles 10. As described in EP 2 741 977 A1, these push the transport unit from one rack into the adjacent rack without further active conveying technology in the rack. Alternatively, the shuttles 10 can change aisles via cross-rails and can change rack levels via corresponding lifts. These shuttles are referred to as roaming shuttles. The cross-rails can be provided with crossing areas, points or turns in order to change aisles without transferring the vehicles.

In the exit region 5, goods of an order—after consolidation and sorting—are removed from storage in a sequence as determined by the order on exit conveying paths 13 in the storage-removal level 12.

To this end, the different rack levels of the storage rack aisles 9 are connected to the storage-removal level 12 via goods lifts 11. Each storage rack aisle 9 or each order storage rack aisle is allocated an exit conveying path 13, via which the goods or containers are removed from storage from the aisle.

From there, they move to order completion where packaging and dispatch take place. Palletization on pallets or roll cars can also take place there.

The method can be performed as follows:

Initially, single-type containers 100 are conveyed via a first entry conveying path 7 of the conveying system 6 and are placed into storage in storage rack aisles 9. The distribution of single-type containers 100 to the storage rack aisles 9 during placement into storage can occur on the one hand irrespective of their type and irrespective of an order, i.e. optionally. On the other hand, groups of goods can also be placed into storage grouped together in a shop layout. Goods which, when historical aspects are taken into account, are often ordered together can also be placed into storage grouped together.

In order to fulfil an order, all the goods assigned to the order must be removed from storage, as determined by the order, from an order storage rack aisle determined from the storage rack aisles 9. To this end, the process occurs as follows in accordance with the invention.

Initially, mixed containers 200 of an order are created. To this end, a picking station 14 is supplied with single-type containers 100 from the store 3 via a picking conveying path 15. This supply can also occur via an intermediate buffer. Then, at the respective picking station 14, the required mixed containers 200 are compiled from the goods of the single-type containers 100 which are provided for the order.

Then, the mixed containers 200 compiled in accordance with an order are placed into storage in the store 3 or storage rack aisles 9 via a second entry conveying path 16.

The entry conveying path 16 can also merge with the conveying path 15 so that full containers and mixed containers can use the storage-placement paths together.

The storage-placement aisle for the mixed containers 200 is selected such that as few container movements as possible are required for consolidating with other goods to fulfil the order.

In each case, an order storage rack aisle is thus allocated to the order and the mixed container(s) 200 is/are placed into storage at that location. Placing at least one mixed container 200 provided for an order into storage thus determines the order storage rack aisle for all further goods/containers of the order.

In order to complete the compilation of the goods of the order, single-type containers 100 which are allocated to the order but are not located in the fixed order storage rack aisle 9 are transferred within the storage racks 8 into the order storage rack aisle 9. This occurs by the described cross-transport within the storage racks 8. In this case, containers 100 are passed through cross-conveyance locations 17 between the storage rack aisles 9 in order to be supplied to another storage rack aisle 9 (cf. above).

Ultimately, the mixed and single-type containers 100, 200 which are allocated to the order are removed from storage via the exit conveying paths 13 of the order storage rack aisle in a sequence sorted as determined by the order. "As determined by the order" means in this case that all the goods of the order are removed from storage successively and together. Preferably, this occurs in a desired sequence which corresponds e.g. to the unpacking sequence desired in the order (shop layout).

The invention claimed is:

1. A method for removing goods for one or more orders from storage in a distribution center for order fulfilment, the distribution center having a picking region and a store comprising storage racks and storage rack aisles, wherein an order comprises a combination of goods from single-type containers and at least one mixed container, and wherein when an order is present all the goods assigned to the order are removed from a particular order storage rack aisle of the storage racks at which all goods of the order are stored, the method comprising:

initially placing goods into storage into the storage racks in the form of single-type containers;

transferring so as to be accessible from an order storage rack aisle designated for the order, single-type containers of goods that are required to fulfil the order but are not at the order storage rack aisle of the storage racks, wherein the single-type containers are transferred via a cross-transport from storage racks along one or more other storage rack aisles;

picking from different single-type containers at the picking region to produce at least one mixed container of the order, wherein the at least one mixed container of the order is produced at at least one picking station that is supplied with single-type containers from the storage racks;

placing the produced at least one mixed container into storage at the order storage rack aisle of the storage racks; and removing all the goods of the order comprising single-type containers and at least one mixed container from storage from the order storage rack aisle.

2. The method of claim 1, wherein the order storage rack aisle is designated by the storage rack aisle into which the at least one mixed container is placed by said placing the produced at least one mixed container into storage.

3. The method of claim 1, wherein said removing all the goods of the order comprises removing the single-type containers and the at least one mixed container from storage in a sorted manner according to a subsequent unpacking sequence.

4. The method of claim 1, wherein the single-type and mixed containers are moved within the storage racks and the storage rack aisles by rack serving apparatuses.

5. The method of claim 4, wherein the rack serving apparatuses comprise shuttle vehicles.

6. The method of claim 4, wherein single-type containers are cross-transported at cross-conveyance locations within adjacent storage racks by a load pick-up device of the rack serving apparatuses.

7. The method of claim 1, wherein the single-type containers are cross-transported between storage rack aisles via aisle-changing rack serving apparatuses.

8. The method of claim 7, wherein the aisle-changing rack serving apparatuses comprise aisle-changing shuttle vehicles.

9. The method of claim 8, wherein an aisle change takes place via dedicated travel paths.

10. The method of claim 2, wherein said removing all the goods of the order comprises removing the single-type containers and at least one mixed container from storage in a sorted manner according to a subsequent unpacking sequence.

11. The method of claim 10, wherein the single-type and mixed containers are moved within the storage racks and the storage rack aisles by rack serving apparatuses.

12. The method of claim 11, wherein the rack serving apparatuses comprise shuttle vehicles.

13. The method of claim 12, wherein single-type containers are cross-transported at cross-conveyance locations within adjacent storage racks by a load pick-up device of the shuttle vehicles.

14. The method of claim 13, wherein an aisle change takes place via dedicated travel paths.

15. The method of claim 11, wherein the rack serving apparatuses comprise aisle-changing rack serving apparatuses.

16. The method of claim 15, wherein the aisle-changing rack serving apparatuses comprise aisle-changing shuttle vehicles.

17. The method of claim 16, wherein an aisle change takes place via dedicated travel paths.

\* \* \* \* \*